US008958921B2

(12) United States Patent
Xu et al.

(10) Patent No.: US 8,958,921 B2
(45) Date of Patent: Feb. 17, 2015

(54) METHOD FOR OPERATING BUILDING CLIMATE CONTROL SYSTEM USING INTEGRATED TEMPERATURE AND HUMIDITY MODELS

(75) Inventors: Jingyang Xu, Malden, MA (US); Daniel Nikolaev Nikovski, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 404 days.

(21) Appl. No.: 13/538,696

(22) Filed: Jun. 29, 2012

(65) Prior Publication Data

US 2014/0000836 A1 Jan. 2, 2014

(51) Int. Cl.
*G05B 17/00* (2006.01)

(52) U.S. Cl.
USPC ............ 700/276; 700/31; 236/44 R; 236/1 C; 165/288; 703/2; 703/13

(58) Field of Classification Search
CPC . F24F 11/006; F24F 11/0086; F24F 11/0012; F24F 11/001; F24F 11/0015
USPC ........... 700/31, 276; 236/44 R, 1 C; 165/288; 703/2, 13
See application file for complete search history.

(56) References Cited

U.S. PATENT DOCUMENTS 5,115,967 A * 5/1992 Wedekind .................. 236/46 R
5,197,666 A * 3/1993 Wedekind .................. 236/46 R
6,699,120 B1 * 3/2004 Darum .......................... 454/239
7,460,984 B1 * 12/2008 Clark et al. ....................... 703/2
2010/0262298 A1 * 10/2010 Johnson et al. ............... 700/277

OTHER PUBLICATIONS

S.M. Cornick et al., "A Comparison of Empirical Indoor Relative Humidity Models with Measured Data," NRCC-49235 Institute for Research in Construction, http://irc.nrc-onrc.gc.ca; Journal of Building Physics, V. 31, No. 3, Jan. 2008, pp. 243-268.
R Jones, "Indoor Humidity Calculation Procedures," Building Serv. Eng. Res. Technol. 16(3) 119-126 (1995).

* cited by examiner

*Primary Examiner* — Mohammad Ali
*Assistant Examiner* — Sheela S Rao
(74) *Attorney, Agent, or Firm* — Dirk Brinkman; Gene Vinokur

(57) ABSTRACT

A climate control system for a building includes air conditioning systems and ventilation (HVAC) systems. The system is controlled by determining sensible cooling and heating rates using temperature differences at inlets and outlets at evaporators, as well as moisture absorption, moisture desorption, ventilation influences, human activities, and condensation at the evaporator. Humidity differences and temperature differences are determined as driving forces for moisture absorption, desorption, and temperatures and humidities of interior fabrics. The differences are obtained from a thermal circuit model. A latent cooling rate is determined using the humidity differences. The model integrates a temperature model and a humidity model for jointly predicting temperatures and humidities for operating the HVAC systems using a mass transfer process.

12 Claims, 8 Drawing Sheets

$$\frac{dm}{dt} = k_1(h_z - h_{lsurf}) + k_2(T_z - T_{lsurf})$$

mass transfer function

300

METHOD FOR OPERATING BUILDING CLIMATE CONTROL SYSTEM USING INTEGRATED TEMPERATURE AND HUMIDITY MODELS

FIELD OF THE INVENTION

This invention relates generally to modeling building climate control systems, and more particularly to predicting internal temperature and humidity conditions for operating heating, ventilation, and air conditioning (HVAC) systems.

BACKGROUND OF THE INVENTION

It is important to accurately predict internal temperature and humidity conditions for a climate controlled building. Accurate predictions can support optimal operation and evaluation of a heating, ventilation, and air conditioning (HVAC) system, and facilitate the efficient operation of the HVAC system for a changing internal and external climatic environment over a planning time interval.

In a building climate control systems with a HVAC system, a number of control signals are usually applied to the system based on comfort for occupants. Comfort is usually dependent on temperature and humidity. For each day, the HVAC operation plans should keep the temperature and humidity of air in building zones within a certain range under various outside and inside environmental conditions.

There are a number of factors that affect the internal temperature and humidity of buildings. Among these factors, the HVAC system cooling and thermal output and ventilation rates are controllable by a HVAC controller. Some factors are predictable, such as the outside air temperature and humidity. Some factors are controllable, such as HVAC operations. Some factors, such as building thermal characteristics and occupancy pattern, are relatively constant for a specific building, but not accurately measurable because human activity generates extra heat and moisture. All these inputs to the building control system lead to difficulty in an accurate prediction of the internal building temperature and humidity.

Most of known building models use temperature models and humidity models that operate independently. Because temperature and humidity dynamics are usually coupled, the performance of those models is usually suboptimal when temperature and humidity are considered independently.

It is desired to improve the performance of models for building climate control systems.

SUMMARY OF THE INVENTION

Embodiments of the invention provide an integrated temperature and humidity model for operating a building climate control system. The model is based on joint temperature and humidity dynamics. A sensible cooling rate and a latent cooling rate can be estimated using the temperature and humidity at an inlet and outlet of an evaporator.

The saturation specific humidity is approximated using a linear function of zone temperatures. The ventilation outlet specific humidity is approximated using indoor and outdoor humidity.

When a changing ventilation fan speed is considered, an iterative procedure is used for fast training.

The model yields an accurate joint prediction of building temperature and humidity for operating the climate control system.

DETAILED DESCRIPTION OF THE PREFERRED EMBODIMENTS

Figure 1A:
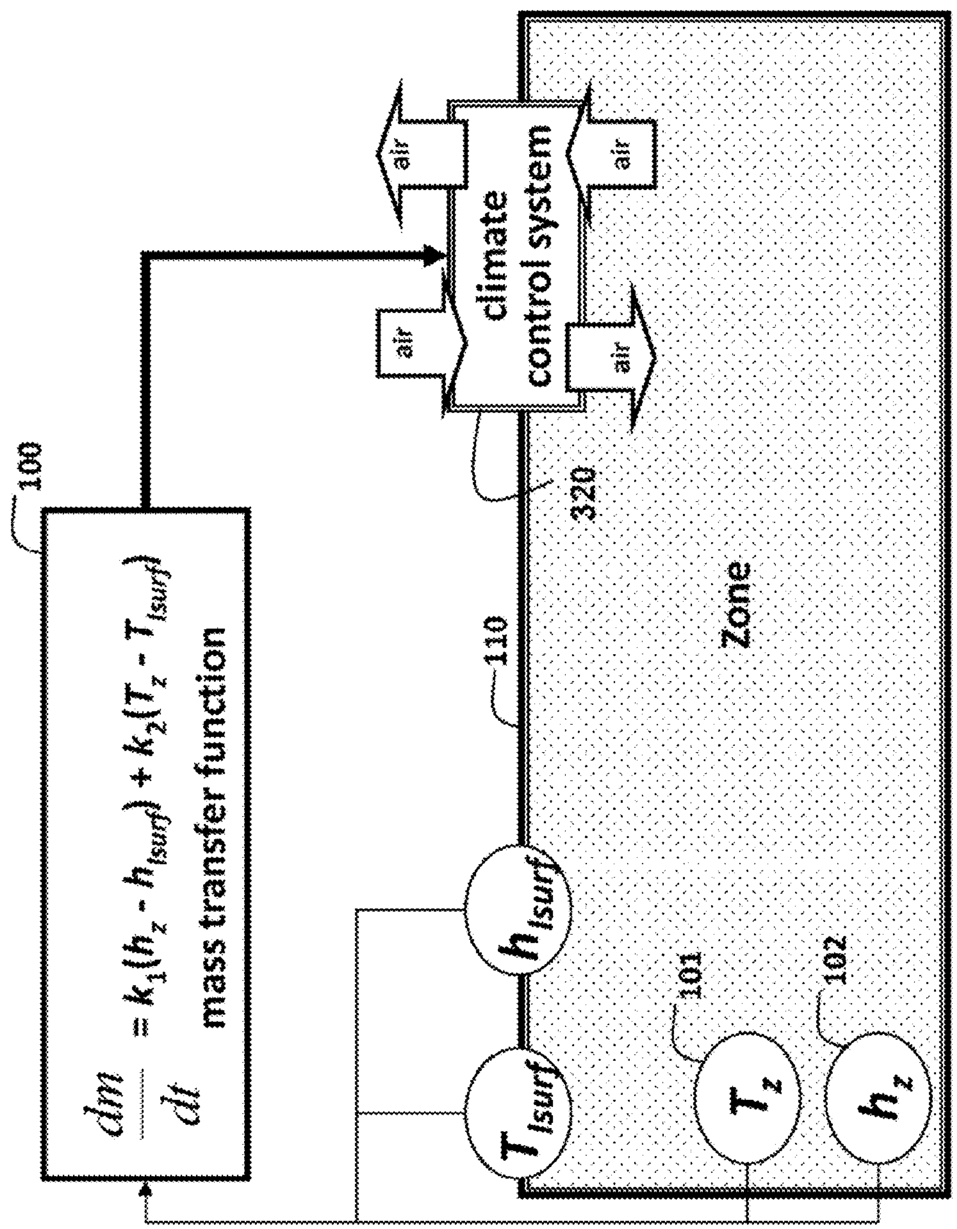
FIG. 1A is a schematic of a method and system for operating a building climate control system according to embodiments of the invention.

As shown in FIG. 1A, the embodiments of our invention provide a method and system for operating a climate control system 320 for a zone in a building. The climate control system can include a heating, ventilation, and air conditioning (HVAC) systems. The system can exchange air between the inside and outside environment of the building.

Temperatures $T_z$ and $T_{Isurf}$ 101-102 and humidities $h_z$ and $h_{Isurf}$ 102-103 in the zone 110 and for the interior fabrics are acquired. A mass transfer process $$\frac{dm}{dt} = k_1(h_z - h_{Isurf}) + k_2(T_z - T_{Isurf})100$$

to operate the climate control system 320 is a weighted combination of a difference of the humidities of the zone and the interior fabrics plus a difference between the temperatures of the zone and the interior fabrics. The weights $k_1$ and $k_2$ can be determined empirically.

Figure 3:
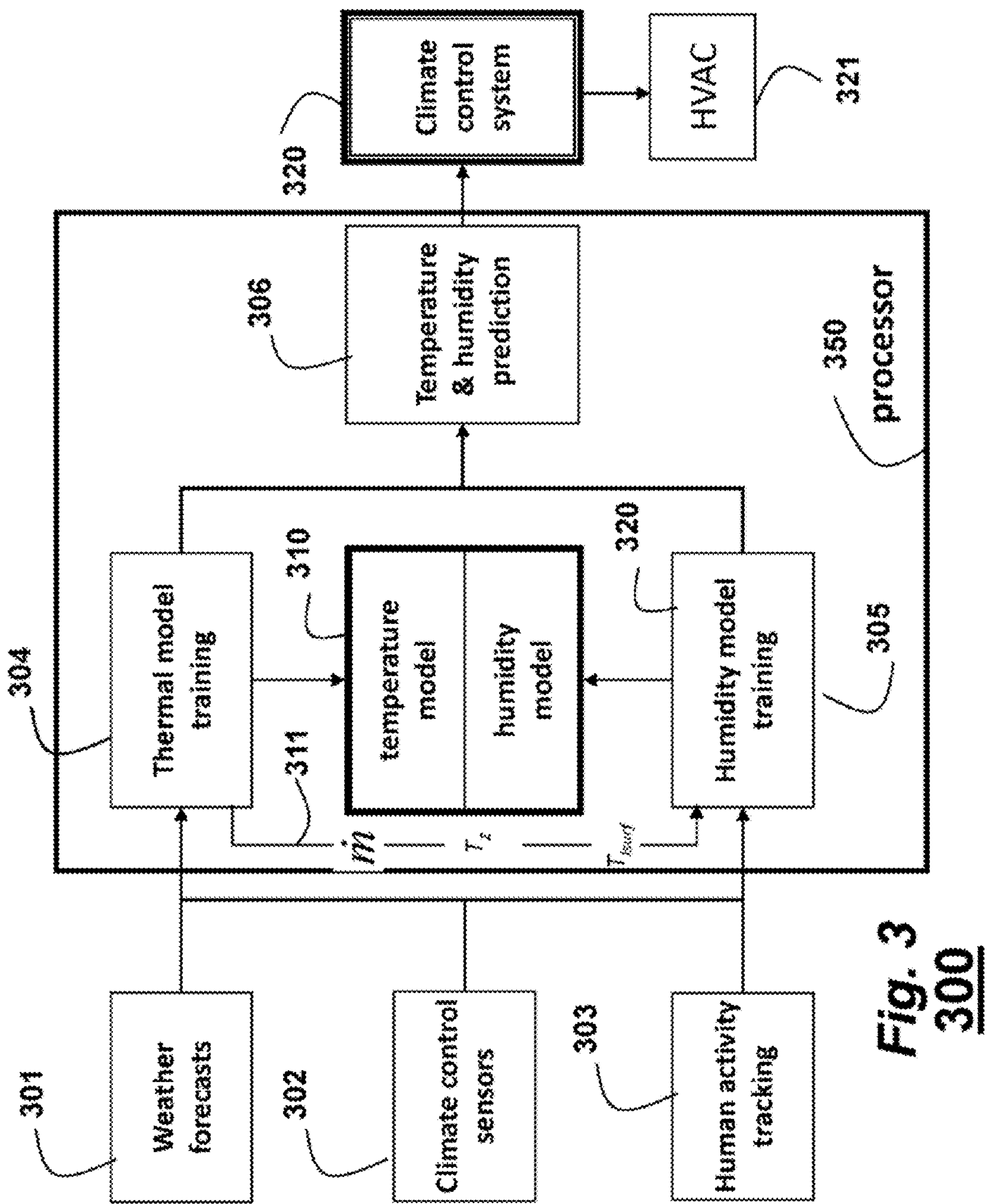
FIG. 3 is a flow diagram of data collection, model training and prediction according to embodiments of the invention.
Figure 4:
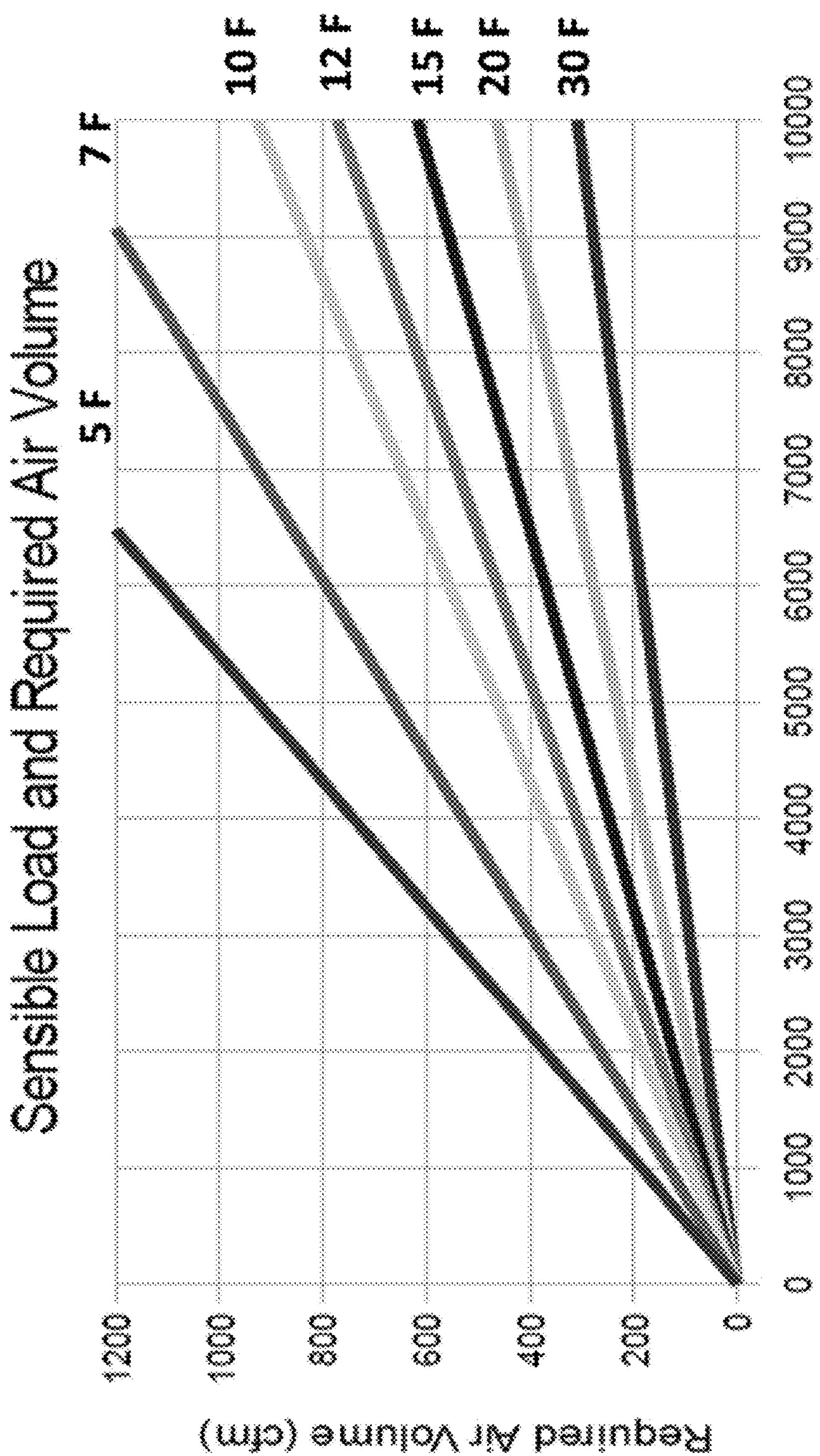
FIGS. 4-7 are graphs of conventional sensible and latent cooling loads.
Figure 5:
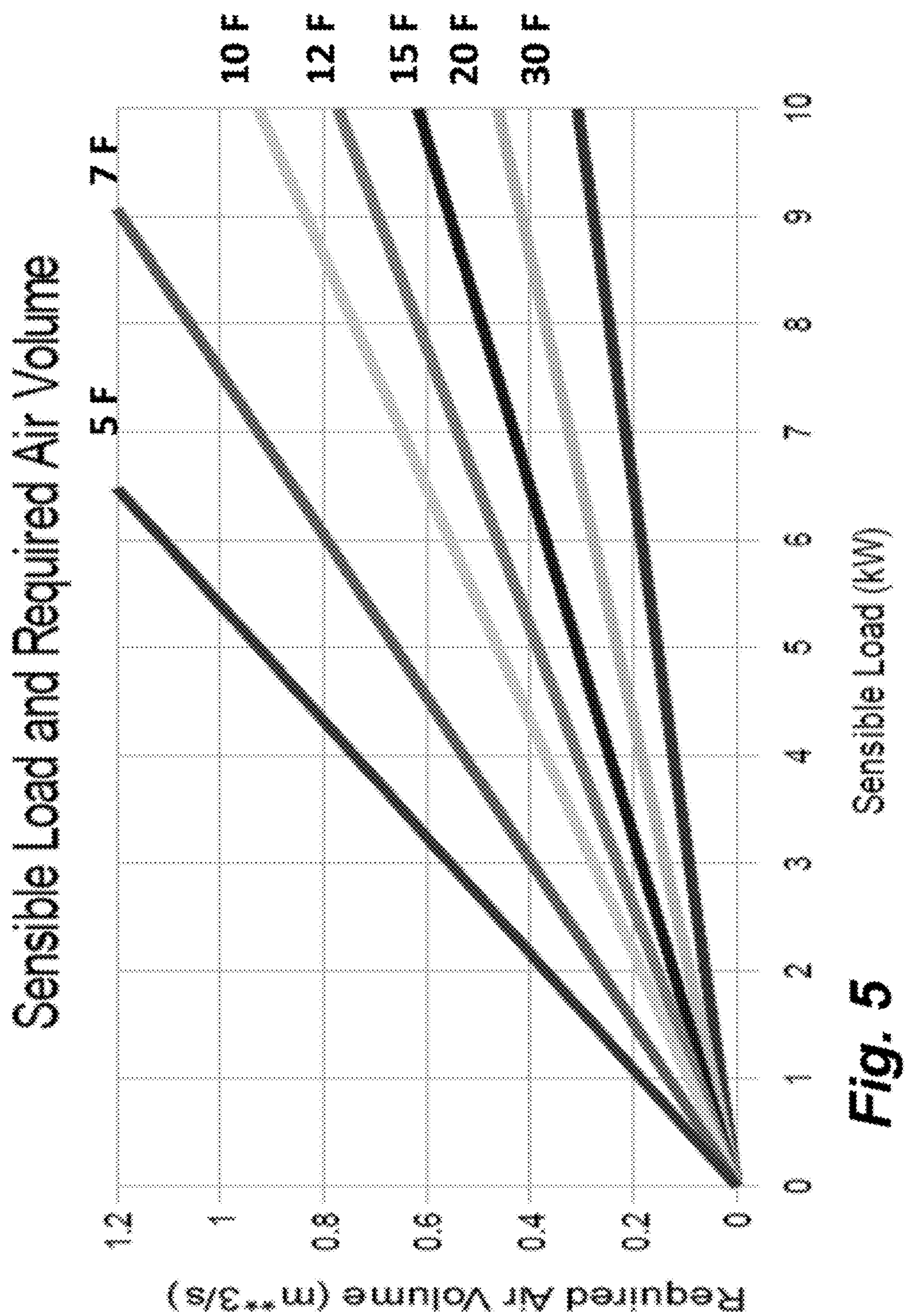
Figure 6:
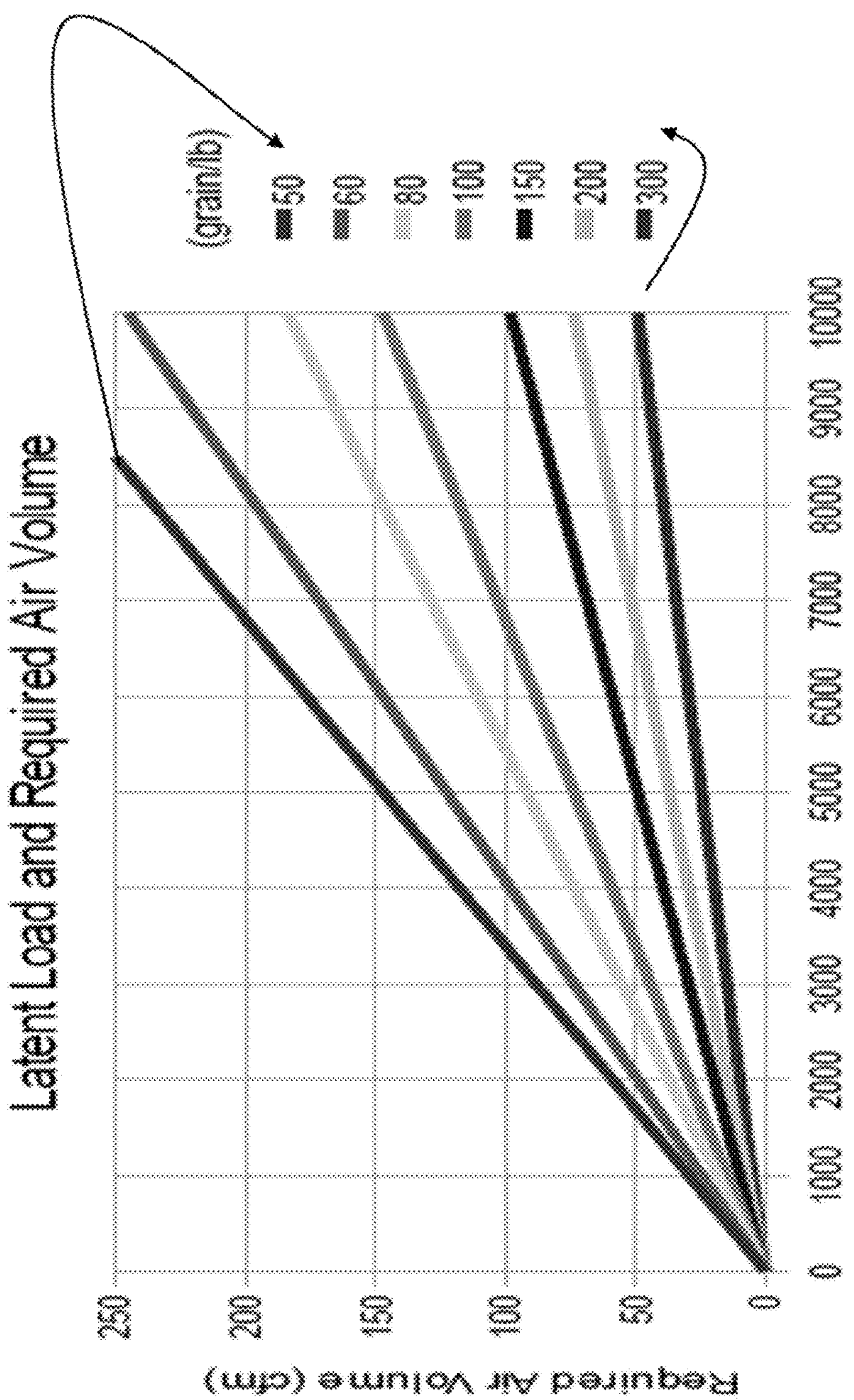
Figure 7:
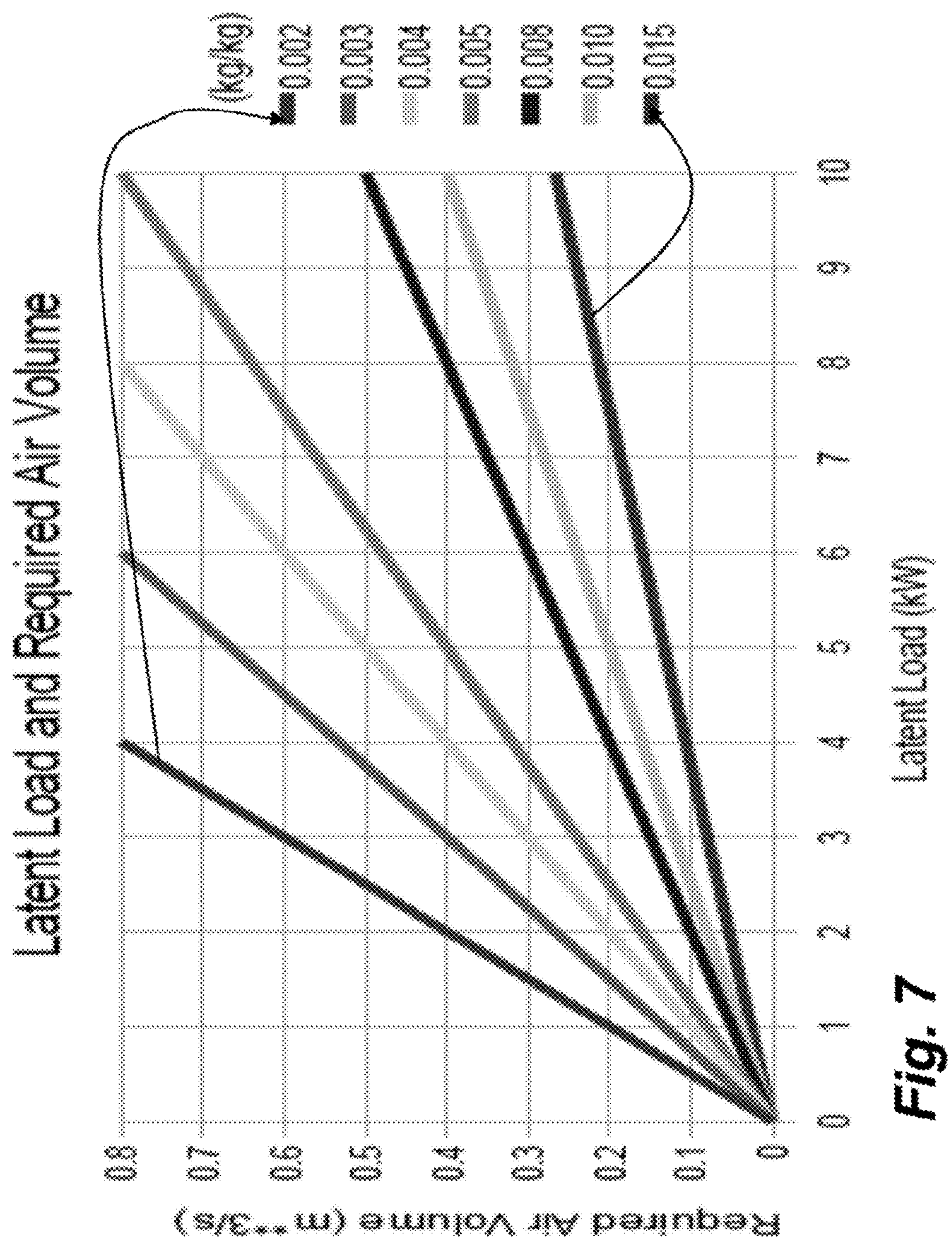

The embodiments of our invention collect data to construct and train an integrated temperature and humidity model for operating a building climate control system, see FIG. 3.

Figure 1B:
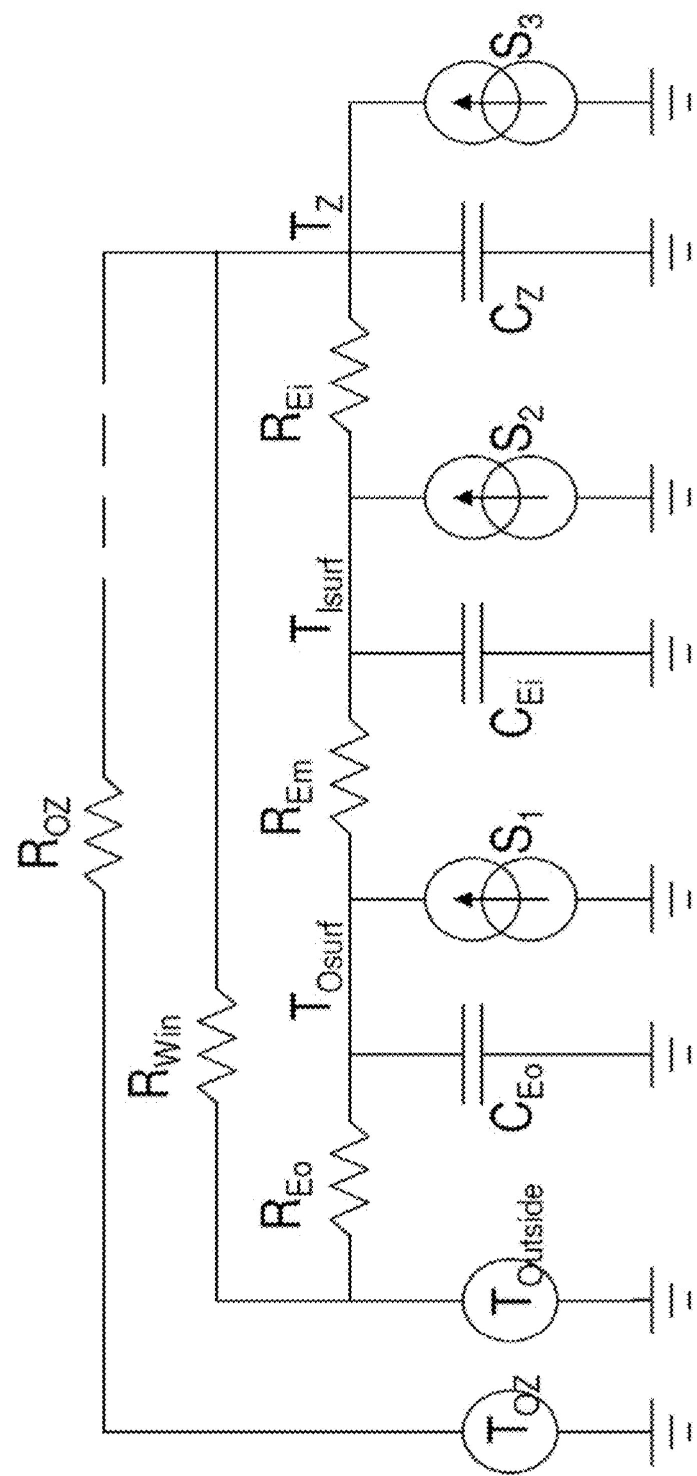
FIG. 1B is a schematic of a circuit representing an integrated temperature model for operating a building climate control system according to embodiments of the invention.

FIG. 1B shows a representation of the integrated temperature and humidity model in a form of a circuit diagram. The model can be used to predict air temperature for building zones for specified time intervals.

In FIG. 1B, the various components of the circuit, such as resistors, capacitors, controls, and thermal flows (rate of change of temperature over time), and variables and coefficients used in the equations below are defined as follows:

a. $C_{Eo}$—thermal capacitance of the outside surface;
b. $C_{Ei}$—thermal capacitance of the inside surface;
c. $C_Z$—thermal capacitance inside air;
d. $E_{outside}$—air enthalpy at outside environment;
e. $E_{vent}$—air enthalpy at outlet of ventilation system;
f. $G_{Ne}$—coefficient for radiation impact of heat factor on outside surface temperature;
g. $G_{Ni}$—coefficient for radiation impact of heat factor on inside surface temperature;
h. $h_{sat}$—saturation specific humidity at corresponding air temperature;
i. $h_z$—inside air specific humidity;
j. $h_{vent}$—specific humidity for air from ventilation outlets;
k. $h_v$—evaporation thermal rate for unit amount of water;
l. $H_{r1}$—specific humidity at the inlet of the evaporator;
m. $H_{r2}$—specific humidity at the outlet of the evaporator:

n. I—radiation factor;

o. $I_r$—coefficient for occupancy impact of heat factor on inside air temperature and inside surface temperature;

p. $\dot{m}$—air flow speed at an evaporator, which is a component of an indoor cooling unit;

q. n—air exchange rate between inside and outside air though wall;

r. O—occupancy factor;

s. $P_{sat}$—saturation vapor pressure at corresponding air temperature;

t. $P_{atm}$—atmosphere air pressure;

u. $Q_L$—latent cooling load;

v. $Q_S$—sensible cooling load;

w. $Q_{source}$—moisture generation rate related to human activities;

x. $R_{Oz}$—thermal resistance between a current zone and another zone;

y. $R_{Win}$—thermal resistance between outside air and inside air through windows;

z. $R_{Eo}$—thermal resistance between outside air and the outside surface;

aa. $R_{Em}$—thermal resistance between the outside surface and the inside surface;

bb. $R_{Ei}$—thermal resistance between the inside surface and the inside air;

cc. $S_{vent}$—ventilation air exchanging rate dd. $S_d$—fan speed at evaporator ee. t—time ff. $T_{e1}$—air temperature at the inlet of the evaporator;

gg. $T_{e2}$—air temperature at the outlet of the evaporator;

hh. $T_{Osurf}$—outside surface temperature;

ii. $T_{Outside}$—outside air temperature;

jj. $T_{Oz}$—other zone temperature;

kk. $T_{Isurf}$—inside surface temperature;

ll. $T_Z$—inside air temperature;

mm. $V_a$—inside air volume;

nn. $h_{sat}$—saturation specific humidity;

oo. $h_{Outside}$—outside air specific humidity;

pp. $h_{vent}$—air specific humidity at outlet of ventilation system;

qq. $k_1$—weight of humidity difference;

rr. $k_2$—weight of temp difference;

ss. ρ—density of air;

and α, β, δ, ϵ, and γ are specifiable coefficients.

Table 1 shows some typical example values for some of the parameters.

TABLE 1

| Parameter Name | Parameter Value |
|---|---|
| $R_{Oz}$ | 0 |
| $R_{Win}$ | 0.1295 |
| $R_{Eo}$ | 0.3846 |
| $R_{Em}$ | 0.0511 |
| $R_{Ei}$ | 0.0261 |
| $C_{Eo}$ | 7.3447e+05 |
| $C_{Ei}$ | 9.5709e+05 |
| $C_Z$ | 9.3473e+04 |

The integrated temperature and humidity model considers building thermal capacity of the zone, human activities in the zone, and outside climatic conditions. Jointly, the model also considers absorption and desorption of moisture of interior fabrics of the building, moisture condensation at the evaporator of indoor units, air exchange by ventilation systems, and human activities related moisture generation.

Generally, the interior fabrics of a building, as known in the art, are architecturally defined as walls, floor, carpeting, ceiling construction, furnishing, etc. The surface of the inside wall is a good approximation of the interior fabrics. Hence, measuring the temperature, and moisture absorption, desorption and absorbtion is sufficient.

The corresponding equation for our integrated temperature and humidity model is represented by equations. (1-4) below.

Figure 2:
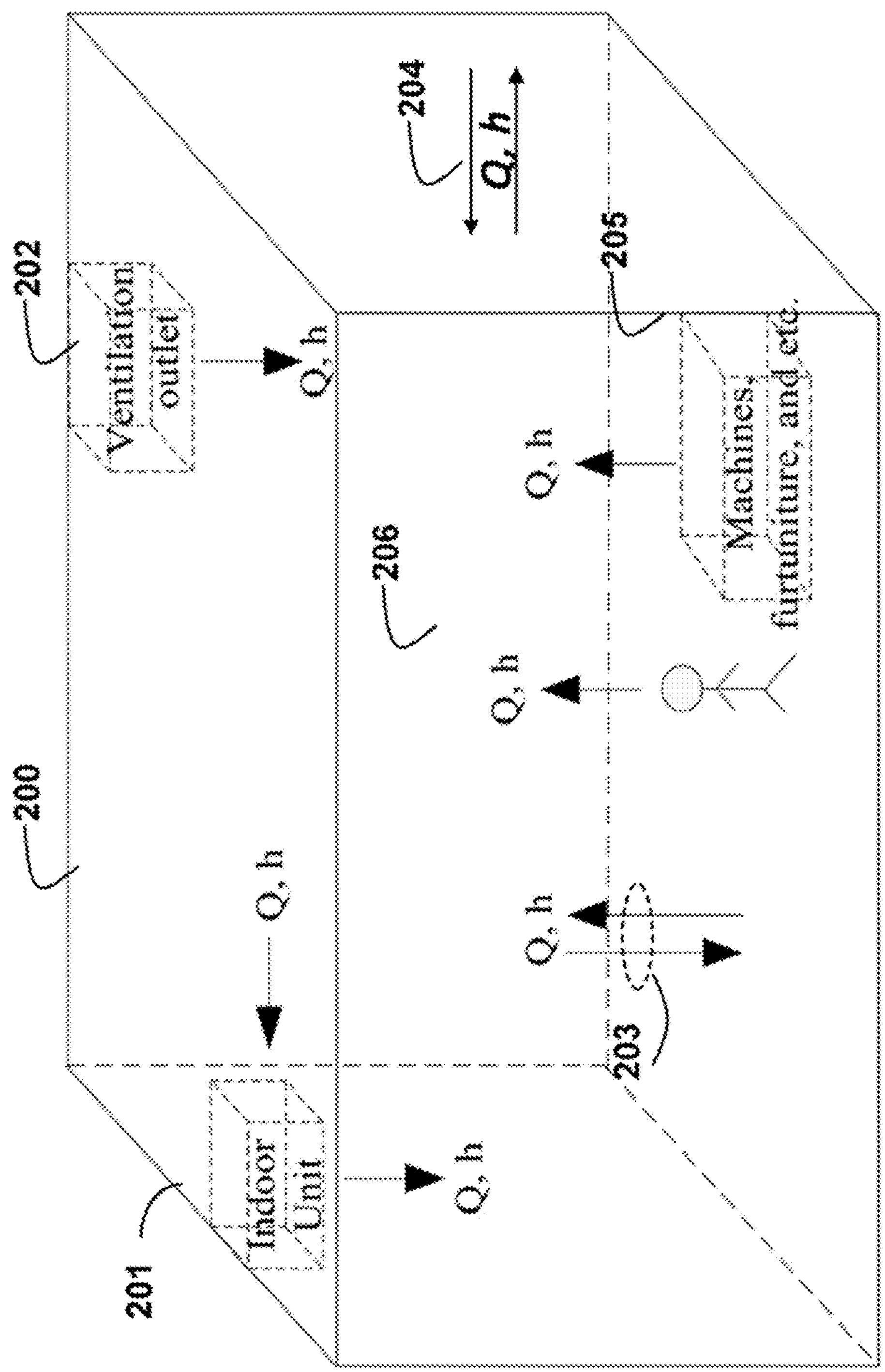
FIG. 2 is a schematic of an internal building environment with heat and moisture exchange processes that are considered by the model of FIG. 1B.

FIG. 2 schematically shows the factors considered as inputs for the climate control system. In FIG. 2, the thermal and moisture transport processes are shown for a zone 200. An indoor unit 201 takes air in the zone at a certain rate, and outputs the air with a different temperature and humidity.

A ventilation outlet 202 transports outside air into the zone. There are heat Q and moisture h exchanges 203 between zone air and internal fabrics of the zone. There also are heat and moisture exchanges 204 between outside air and zone air and moisture generation process related to machines, furniture, equipment 205 and human activities 205.

The equations (1-4) represent the dynamics of our integrated temperature and humidity model.

Equation (1) determines the thermal flow (rate of change of temperature over time) of the outside wall surface $$\frac{dT_{Osurf}}{dt} = \frac{T_{Outside} - T_{Osurf}}{E_{Eo}C_{Eo}} + \frac{T_{Isurf} - T_{Osurf}}{R_{Em}C_{Eo}} + \frac{G_{Ne}I}{C_{Eo}}. \quad (1)$$

Equation (2) determines the thermal flow of the inside wall surface $$\frac{dT_{Isurf}}{dt} = \frac{T_{Osurf} - T_{Isurf}}{R_{Em}C_{Ei}} + \frac{T_Z - T_{Isurf}}{R_{Ei}C_{Ei}} + \frac{G_{Ni}I + I_rO}{C_{Ei}}. \quad (2)$$

Equation (3) determines the thermal flow of the inside air $$\frac{dT_Z}{dt} = \frac{T_{Outside} - T_Z}{R_{Win}C_Z} + \frac{T_{Isurf} - T_Z}{R_{Ei}C_Z} + \frac{T_{OZ} - T_Z}{R_{Oz}C_Z} + \frac{\dot{m}Q_S + (1 - I_r)O}{C_Z}. \quad (3)$$

Equations (1-3) are based on Kirchhoffs and Ohm's laws, where temperature and heat flow are treated as counterparts for voltage and current.

Equation (4) determines the rate of change over time of the inside air $$\frac{dh_z}{dt} = -\alpha h_z + \beta h_{sat} - n(h_z - h_{Outside}) + \frac{Q_{source}}{\rho V_a} + \epsilon(T_Z - T_{Insurf}) - \delta S_{vent}(h_z - h_{vent}). \quad (4)$$

Equation (4) is our adaptation of a humidity model, e.g., the BRE admittance model, Building Research Establishment (BRE), Watford, U.K, see the Appendix.

The conventional BRE admittance model does not consider the impact of the temperature on the humidity, the impact of condensation on the zone humidity at the evaporator, nor the impact of ventilation system. In other words, the humidity is modeled with the (erroneous) assumption that the inside and outside temperatures are always constant and equal, and that the ventilation rate is non-varying. All of these are invalid assumptions we correct.

The impact on inside humidity takes effect by changing a mass transfer process (humidity) between the inside air and interior fabrics. The mass transfer equation between the inside air and interior fabrics, with both humidity difference and temperature difference as driving forces, is $$\frac{dm}{dt} = k_1(h_z - h_{Isurf}) + k_2(T_Z - T_{Isurf}). \tag{5}$$

Our integrated temperature and humidity model, in the form of equations (1-4), is a nonlinear model. Linear approximation can provide a more stable and faster training process.

However, the relation between saturation specific humidity $h_{sat}$ and inside air temperature $T_Z$ is nonlinear.

The nonlinear relation can be expressed using $$P_{sat} = e^{\frac{77.345+0.0057T_Z-7235/T_Z}{T_Z^{8.2}}}, \text{ and} \tag{6}$$

$$h_{sat} = \frac{0.62198P_{sat}}{P_{atm} - P_{sat}}, \tag{7}$$

where $P_{sat}$ is the saturation vapor pressure at a corresponding zone temperature, and $h_{sat}$ is saturation specific humidity at corresponding zone temperature to obtain convergence.

Within a zone temperature range, the saturation specific humidity $h_{sat}$ can be approximated as a linear function of $T_Z$. With a linear approximation for saturation specific humidity under a normal zone temperature, we have equation (4) updated to equation (8)

$$\frac{dh_z}{dt} = -\alpha h_z + \beta' T_Z + \gamma - n(h_z - h_{Outside}) + \frac{Q_{source}}{\rho V_a} + \epsilon(T_Z - T_{Isurf}) - \delta S_{vent}(h_z - h_{vent}) + \frac{Q_L \dot{m}}{h_u \rho V_a}. \tag{8}$$

FIG. 3 shows the training and prediction for a two step procedure to accelerates convergence. FIG. 3 shows how the integrated temperature and humidity model 300 is trained, and used for temperature and humidity prediction 306. The prediction can be used to operate the climate control system 320, which can include the HVAC 321. The training 304 for the temperature model 310 and the training 305 for the humidity model 320 use data acquired from weather forecasts 301, sensors of the climate control (HVAC) system 302, and human activity tracking 303.

The data collection, training and prediction can be performed by a processor 350 including memory and input/output interfaces connected to the climate control system, and sensors in an environment.

The first step is to train 304 the temperature model 310 using equations (1-3) to predict temperatures in the zone, as well as, and the airflow at the evaporator $\dot{m}$, air temperature $T_Z$, and wall surface temperature $T_{Isurf}$ from the temperature model.

The second step is to train 305 the humidity model 320 using measured and predicted data 301-303, and $\dot{m}$, $T_Z$, and $T_{Isurf}$ 311 from the first step.

FIGS. 4-7 show graphs of conventional sensible and latent cooling loads. The sensible cooling load refers to the dry bulb temperature and the latent cooling load refers to the wet bulb temperature of the building. The humidity influence on the sensible and latent loads must be determined.

Sensible cooling and latent load estimations are used for the integration of the temperature and humidity models of the embodiments of the invention, because the total energy consumed by the HVAC system on cooling is a composite of sensible cooling that cools down inside air, and latent cooling that causes a phase change and condensates vapor into water from the inside air.

A sensible cooling rate is estimated using $$Q_S = S_d(T_{e2} - T_{e1}), \tag{9}$$

and a latent cooling amount is estimated using $$Q_L = \min(0, S_d(H_{r2} - H_{r1})). \tag{10}$$

The ventilation system influences the system humidity by the transport of outside air, to the inside, that has varying temperature and humidity.

For the ventilation system, the air temperature $T_{vent}$ at the outlet of the ventilation unit can be expressed as a linear function of the indoor air temperature $T_Z$, and the outdoor air temperature $T_{outdoor}$.

The ventilation outlet enthalpy $E_{vent}$ (total thermodynamic energy) can be estimated using the outdoor enthalpy $E_{outside}$, and the indoor enthalpy $E_Z$.

Equations (11-12) represent the approximation for air temperature and enthalpy from outlets of an example ventilation system a. $T_{vent} = T_{Outside} - A(T_{Outside} - T_z)$; (11)

and b. $E_{vent} = E_{Outside} - B(E_{Outside} - E_z)$, (12)

where A and B are user supplied constants.

Under normal zone temperature and normal fluctuation range of indoor and outdoor temperatures, a linear approximation for ventilation outlet specific humidity $h_{vent}$ can be obtained.

Equation (13) represents the linear approximation function for $h_{vent}$ of the indoor specific humidity $h_z$, and the outdoor specific humidity $h_{outside}$ using a, b, c as weighting coefficients $$h_{vent} = a h_{Outside} + b h_z + c. \tag{13}$$

In equations (11-13), $E_{Outside}$, $h_{Outside}$, and $T_{Outside}$ can be obtained from weather forecasts.

In a ventilation system with a changing fan speed $S_{vent}$, the humidity model becomes nonlinear $$\frac{dh_z}{dt} = -\alpha h_z + \beta' T_Z + \gamma - n(h_z - h_{Outside}) + \frac{Q_{source}}{\rho V_a} + \epsilon(T_Z - T_{Isurf}) - \delta S_{vent}(h_z - h_{vent}) + \frac{Q_L \dot{m}}{h_v \rho V_a}, \tag{14}$$

and the computational complexity increases.

An iterative procedure can be performed with the following steps during humidity model related training, modeling and prediction:

1. Training the humidity model assuming the ventilation system operates at a constant speed;
2. Using predicted zone specific humidity obtained from the humidity model to determine the ventilation system outlet specific humidity;
3. Training the humidity model using the ventilation system outlet specific humidity and $S_{vent}$ information as known inputs; and 4. Comparing updated zone specific humidity predictions with existing zone specific humidity predictions. If a difference is less than a certain tolerance given, then stop and output most recent zone specific humidity prediction as prediction results; otherwise, go to step 2.

EFFECT OF THE INVENTION

The embodiments of the invention provide an accurate model that can jointly predicts building temperature and humidity for time intervals. The joint predictions can be used to operate a climate control system. In other words, the model is used to transform physical climatic conditions, i.e., temperature and humidity to control signals for the system.

The model has an empirical estimation error of ~0.025% and ~1.5% for zone temperature and relative humidity, respectively. For a building with ten zones, the prediction error for relative humidity is about 2~5%. The prediction error for zone temperature is less than 1%. These results outperforms models that based on either just the temperature or just the humidity.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

APPENDIX

Prior Art BRE Admittance Model where Inside and Outside Temperatures are Constant and Equal $$\frac{dW_i}{dt} = \frac{Q_{source}}{\rho v} - I(W_i - W_o) - (\alpha W_i - \beta W_{sat})$$

where $W_i$=indoor air moisture content, kg/kg (lb/lb))

$W_o$=outdoor air moisture content, kg/kg (lb/lb)

$W_{sat}$=saturation moisture content of indoor air, kg/kg (lb/lb)

$Q_{source}$=moisture generation rate, kg/h (lb/h)

I=air exchange rate (ach)

ρ=density of air, 1.22 kg/m$^3$ (0.075 lb/ft$^3$)

ν=volume of space, m$^3$ (ft$^3$)

α & β=moisture admittance factors (h$^{-1}$)

We claim:

1. A method for operating a climate control system for a zone of a building, comprising the steps of:

determining sensible cooling and heating rates for the climate control system using temperature differences at an inlet and outlet of an evaporator;

determining moisture absorption, moisture desorption, ventilation influences, human activities, and condensation at the evaporator;

determining humidity differences and temperature differences as driving forces for moisture absorption and the moisture desorption at the interior fabrics, where the temperature difference is obtained from a thermal circuit model; and determining a latent cooling rate using the humidity differences, wherein the model integrates a temperature model and a humidity model for jointly predicting a temperature and humidity for operating the climate control system acquiring temperatures Tz and humidities $h_z$ of the zone, and temperatures $T_{Isurf}$ and humidities $h_{Isurf}$ of interior fabrics in the zone;

determining a mass transfer process $$\frac{dm}{dt} = k_1(h_z - h_{Isurf}) + k_2(T_z - T_{Isurf})$$

to operate the climate control system, where $k_1$ and $k_2$ are weights.

2. The method of claim 1, further comprising:

approximating a saturation specific humidity using a linear function of the temperatures in the zone.

3. The method of claim 1, wherein the climate control system includes a ventilation system, and further comprising:

approximating a specific humidity at an outlet of the ventilation system using a linear function of an indoor humidity and an outdoor humidity.

4. The method of claim 1, wherein an integrated temperature and humidity model considers thermal characteristics of the building, human activities, and outside climatic conditions.

5. The method of claim 4, wherein the integrated temperature and humidity model considers absorption and desorption of moisture of interior fabrics in the zone, moisture condensation at an evaporator, air exchange by a ventilation systems, and moisture generation by the human activities in the zone.

6. The method of claim 1, wherein the mass transfer process uses sensible cooling and latent cooling based on temperature and humidity differences at an evaporator of the climate control system.

7. The method of claim 3, further comprising:

approximation a saturation specific humidity and a specific humidity at the outlets of the ventilation system.

8. The method of claim 1, further comprising:

providing an integrated temperature and humidity model for operating the climate control system, wherein the model is based on joint temperature and humidity dynamics.

9. The method of claim 1, further comprising:

estimating a sensible cooling rate and a latent cooling rate using temperatures and humidities at an inlet and outlet of an evaporator of the climate control system.

10. The method of claim 1, wherein a relation between a saturation specific humidity and an inside air temperature is nonlinear.

11. The method of claim 1, further comprising:

training the temperature model to predict the temperatures in the zone; and training the humidity model using measured and predicted data.

12. The method of claim 11, wherein the predicted data include weather forecasts, sensor data from the climate control system, airflows at an evaporator of the climate control system, inside air humidities $h_z$, and inside surface temperatures $T_z$.

* * * * *